(12) United States Patent
Cha

(10) Patent No.: US 6,173,182 B1
(45) Date of Patent: Jan. 9, 2001

(54) METHOD FOR PROCESSING OF LOCATION REGISTRATION OF A MOBILE PHONE USING CONNECTION-ORIENTED METHOD WITHIN A CALL CONTROL PROCESSOR IN A PERSONAL COMMUNICATION SERVICES (PCS) SYSTEM

(75) Inventor: Hyun-Yung Cha, Seoul (KR)

(73) Assignee: Samsung Electronics Co., Ltd. (KR)

( * ) Notice: Under 35 U.S.C. 154(b), the term of this patent shall be extended for 0 days.

(21) Appl. No.: 09/132,788

(22) Filed: Aug. 13, 1998

(30) Foreign Application Priority Data

Aug. 14, 1997 (KR) .................................................. 97-38902

(51) Int. Cl.[7] ...................................................... H04Q 7/38
(52) U.S. Cl. ........................ 455/435; 455/433; 455/422; 455/525
(58) Field of Search ...................................... 455/435, 422, 455/433, 524.5, 552, 560, 561

(56) References Cited

U.S. PATENT DOCUMENTS

| | | | |
|---|---|---|---|
| 5,479,481 | 12/1995 | Koivunen | 455/422 |
| 5,548,533 | * 8/1996 | Gao et al. | 455/560 X |
| 5,946,634 | * 8/1999 | Korpela | 455/552 |

* cited by examiner

Primary Examiner—Fan Tsang
Assistant Examiner—Philip J. Sobutka
(74) Attorney, Agent, or Firm—Dilworth & Barrese, LLP

(57) ABSTRACT

Location registration processing of a mobile station using the connection-oriented method of the TSB-80 standard of application interface between a base station controller (BSC) and a mobile switching center (MSC) in a personal communication services (PCS) system. The internal processing method of the call control processor (CCP) of the BSC includes the steps of: allocating the block in charge of processing the location registration as a block for processing the protocol between the base transceiver subsystem control processor (BSC) call-control and call control processor (CCP) protocol control block to reduce the number associated with inter-process communication (IPC); connection-oriented processing wherein if the PCX receives a Location Update Request from a base transceiver subsystem control processor (BCP), the CCP protocol control block stores the BCP address or job address of the BCP according to a connection identifier, which is assigned by the CCP protocol control block, as a key, and when a response to a location update request from personal communication exchange (PCX) occurs, the CCP protocol control block transmits a message to a BCP address of the corresponding connection identifier; managing a timer wherein a timer being continuously operated is set together with the starting of the process, and the management increases the time after the message-transmission and, in an established time, the management releases resources; and omitting the signaling connection control part (SCCP) release step by using a SCCP connection reject primitive, which can be used when the PCX transmits a response message to the SCCP.

10 Claims, 4 Drawing Sheets

METHOD FOR PROCESSING OF LOCATION REGISTRATION OF A MOBILE PHONE USING CONNECTION-ORIENTED METHOD WITHIN A CALL CONTROL PROCESSOR IN A PERSONAL COMMUNICATION SERVICES (PCS) SYSTEM

BACKGROUND OF THE INVENTION

1. Field of the Invention

The present invention relates to a method for processing of location registration and, more particularly, to a method for processing the location registration of a mobile station using the connection-oriented method of TSB-80, a standard of an application interface between a base station controller (BSC) and a mobile switching center (MSC).

2. Description of the Related Art

PCS (Personal Communication Services) and CDMA (Code Division Multiple Access) systems comprise a number of BTSs (Base Station Transceiver Subsystems) which provide services to Mobile Stations, BSC (Base Station Controller), BSM (Base Station Management System) which manage a number of BSCs, MSC (Mobile Switching Center), and LR (Location Register) system.

In a mobile telecommunication system, the MSC system and other systems are, in general, called BSS (Base Station Subsystem). The BSS includes the BSM, BSC and BTS, in order of precedence.

The main processor of the BSC is called Call Control Processor (hereinafter it is abbreviated as CCP) and the main processor of the BTS is called BTS Control Processor (hereinafter it is abbreviated as BCP).

The conventional location register system is managed in such a connectionless method with serving a call control block within the CCP as a core block.

However since an application interface standard between the base station controller (BSC) and the Mobile Switching Center (MSC) was introduced, the application interface block such as call control block has been managed with the connection-oriented-method, which is suggested in the standard. As a result of that, a method for processing of location registration, which is different from the prior method, has been necessary.

FIG. 1 illustrates the prior art method for processing of location registration in a Personal Communication Services (PCS) system. As illustrated, the method includes a step 110 of transmitting a registration message to the BCP by mobile station; a step 120 of transmitting a registration message to the CCP by the BCP; a step 130 of transmitting a location update request message to the MSC by the CCP; a step 140 of transmitting a location update accept message to the CCP by the MSC; a step 150 of transmitting a registration accept order message to the BCP by the CCP; and a step 160 of transmitting a registration accept order message to the mobile station by the BCP.

The mobile station transmits the registration message to the BCP to request the location registration in step 110, then the BCP generates a location update request message and transmits it to the CCP in step 120. In step 130, the CCP transmits a location update request message to the MSC.

In step 140, the mobile switching center (MSC) registers the current location of the mobile station and then transmits the location update accept message to the CCP. In step 150, the CCP transmits the location accept order to the BCP. After that, in step 160, the BCP transmits a registration accept order to mobile station to inform the mobile station of the result of processing of location registration.

Through the above steps, the mobile switching center recognizes and registers the location of the mobile station.

In the prior art steps for processing of location registration, the CCP, a processor of the base station controller, transmits and receives messages, which includes a parameter of the address for the BTS (BCP) that has transmitted a location update request message, with the mobile switching center, so the CCP can transmit a response to the BCP that requests a location registration.

In order to respond to the BCP that requests a location registration, by using the non-connection method, as stated above, it is necessary to transmit a location registration information message including BCP address, registration type, etc., as location registration information.

If the location registration process is performed as explained above, in the case where a CCP operates, connected with the MSC of another system that does not use the above parameter, it is highly likely that a problem will result because the MSC of the other system cannot analyze the corresponding message.

However if the added parameter for the BCP address is simply deleted to solve the above problem, the mobile switching center transmits signals in a broadcasting manner that scatters signals over all BCPs. Then, the number of unnecessary messages is increased, so a problem occurs in that the system load is increased. To attempt to solve the problem, the location registration is processed in a connection-oriented method by using an application interface standard.

FIG. 2 illustrates a method for processing of location registration in case of using application interface standard (TSB-80) between BSC and MSC. As illustrated, the method includes the steps of: transmitting a registration message to a base transceiver subsystem control processor (BCP) by a mobile station (step 210); transmitting a registration message to the CCP by the BCP (step 220); transmitting a location update request signal to the MSC by the CCP (step 230); transmitting a location update accept signal to the CCP by the MSC (step 240); transmitting a registration accept order to the BCP by the CCP (step 250); transmitting a registration accept order to the mobile station by the BCP (step 260); transmitting a SCCP RLSD (Release) request message to the CCP by the MSC (step 270); and transmitting SCCP RLC (Release Complete) to the MSC by the CCP (step 280).

The processing of signals rather than information, as stated above, is performed in a signaling connection control part (hereinafter it is abbreviated as SCCP) of the CCP. The SCCP plays a role in establishing a node for signal processing and the connection for signal processing is called a SCCP connection.

The detailed description for the operation of FIG. 2 is as follows:

In step 220, the CCP receives a registration message from the mobile station through the BCP. In step 230, the CCP generates a location update request message including the address of the BCP which transmitted the message. The location update request message is transmitted to the MSC through a Complete Network Layer Information Message, which is used to transmit information between network layers on application interface standard. Then the CCP sets a timer for the connection with MSC (step 290).

The Complete Network Layer Information Message is located within the user data field of SCCP connection request and transmitted from the CCP to the MSC. The message includes a connection management request message, a paging response or a location registration message, etc.

In step 240, the MSC transmits a location update accept message to the CCP so as to inform the corresponding BCP that the location registration request has been processed. If the location registration request is refused, the MSC transmits a location update refuse message to the CCP.

The location update accept message (or location update refuse message) can be included in the SCCP connection confirmed primitive, which indicates SCCP connection status, or included in the SCCP connection refused primitive.

The CCP, which has received the location update accept message, stops a timer for the corresponding connection and in step 250, the CCP transmits registration accept order (if failed, location refused order) to the mobile station through the BCP so as to inform that the location registration has been successfully processed.

If the SCCP connection is disconnected, in step 270, the MSC disconnects the connection in such a way that the MSC transmits to the base station a SCCP RLSD message, which is used in the application interface standard as a procedure of SCCP connection release.

In step 280, the CCP releases the SCCP connection and transmits the SCCP RLC message to the MSC for the response to the SCCP RLSD message.

In step 240, if the MSC has used SCCP connection refused primitive, the step of SCCP RLSD 270 and the step of SCCP RLC 280 are omitted because the SCCP connection has already been refused in the MSC.

If the application interface, as described above is used, a signal for processing of location registration, which is transmitted from the mobile station, should be transmitted to the MSC through the BCP call control block, the CCP call control block and the CCP protocol control block.

Therefore, since the steps for transmitting messages become so numerous, the procedure for processing becomes complicated. In addition, if the above referenced method is used, the number of required messages becomes too numerous. As a result, the system performance is decreased.

U.S. Pat. No. 5,479,481 to Koivunen discloses the prior art concerning this field. The Koivunen patent discloses a method for updating subscriber data in a cellular radio system. In the Koivunen patent, a visitor location register (VLR) receives, from a home location register (HLR) of the cellular radio system, a restart indication and changes the restart number (HLR Reset Num). When the visitor location register (VLR) receives, from a mobile exchange, an indication of the establishment of a radio connection with a subscriber, the visitor location register compares the subscriber-specific restart number of the subscriber with the home location register restart number (HLR Reset Num) of the subscriber, and updates the location data of the subscriber on the basis of the comparison.

The Koivunen patent discloses an improved method for updating subscriber data in a cellular radio system having home location register (HLR) and visitor location register (VLR). However, the Koivunen patent does not disclose a method for processing of location registration in a base station (BS). That is, the location registration is a communication between HLR/VLR and MS, and BS (BSC and BTS) intermediately performs only transmitting messages, so a processing method of the BS has been needed.

SUMMARY OF THE INVENTION

The present invention accepts application interface standards, decreases the number of messages within the possible limit, and simplifies the processing steps. As a result, the present invention provides an improved method for processing of location registration in personal communication services (PCS) system, wherein the method satisfies the standard and is efficient.

That is, one object of the present invention is to provide a method for internal processing of a call control processor (CCP) of a BSC and a method for processing of location registration in a personal communication services (PCS) system.

In carrying out the present invention according to one embodiment, an internal processing method of a call control processor (CCP) of a BSC includes the steps of: (a) allocating the block in charge of processing the location registration as a block for processing the protocol between a base transceiver subsystem control processor (BCP) call-control and a call control processor (CCP) protocol control block to reduce the number associated with inter-process communication (IPC); connection-oriented processing wherein if the personal communication request [PCX] receives a Location Update Request from a base transceiver subsystem control processor (BCP), the CCP protocol control block stores the BCP address or job address of the BCP according to a connection identifier (ID), which is assigned by the CCP protocol control block, as a key, and then when a response to a location update request from personal communication exchange (PCX) occurs, the CCP protocol control block transmits a message to a BCP address of the corresponding connection identifier; managing a timer wherein a timer being continuously operated is set together with starting of process, and the management increases the time after the message-transmission and in a established time the management releases resources; and (d) omitting a signaling connection control part (SCCP) release step by using a SCCP connection reject primitive, which can be used when the PCX transmits a response message to the SCCP.

In carrying out the present invention according to another embodiment, an internal processing method of a call control processor (CCP) of a BSC includes the steps of: (a) transmitting a registration message to a base transceiver subsystem control processor (BCP) by a mobile station; (b) transmitting a registration message to a call control processor (CCP) protocol-processing block as a processor of a base station controller (BSC) by a base transceiver subsystem (BTS); (c) transmitting a location update request message to a mobile switching center (MSC) by the call control processor (CCP); (d) transmitting a location update result message to the call control processor (CCP) by the mobile switching center (MSC); transmitting a location update result message to base transceiver subsystem control processor (BCP) by call control processor (CCP); and (f) transmitting a registration result order message to the mobile station by the base transceiver subsystem control processor (BCP).

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

The invention will be explained in detail with reference to the accompanying drawings.

The present invention is characterized in that it basically accepts the processing steps messages and parameters, which are used by application interface standard (TSB-80), and it adds improvements for the internal processing of a call control processor (CCP) of a base station controller (BSC).

Figure 1:
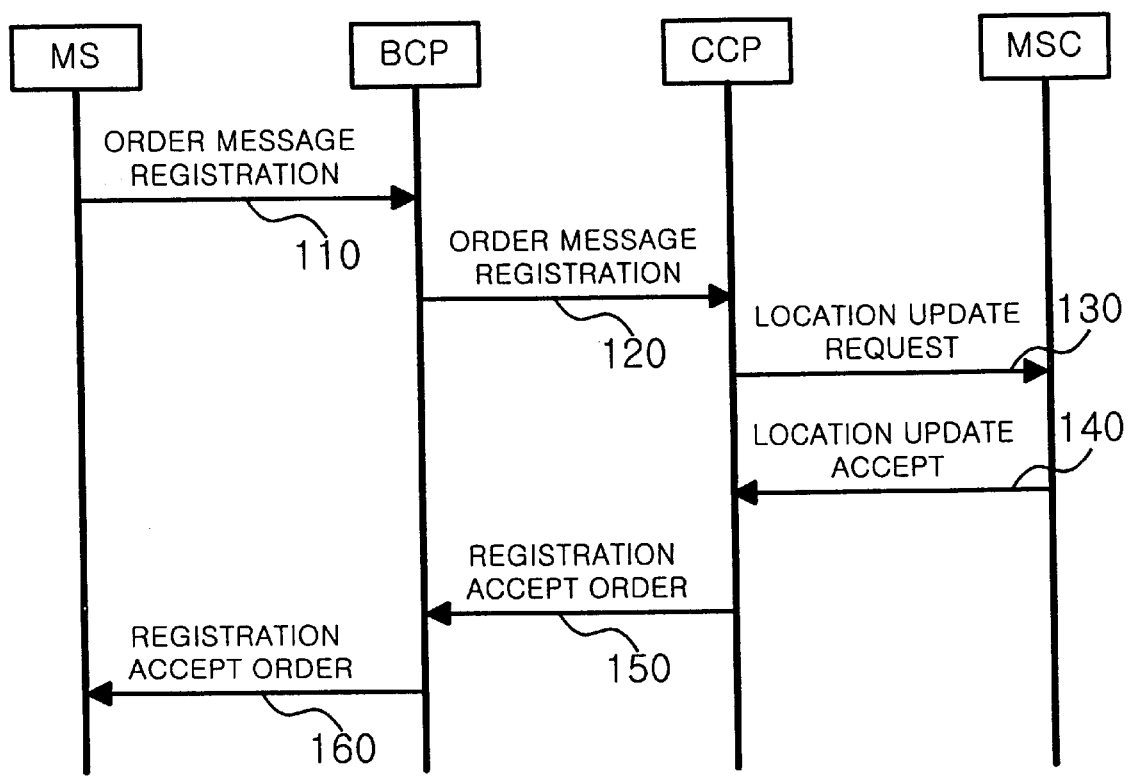
FIG. 1 is a block diagram illustrating the processing of location registration in a personal communication services (PCS) system according to the conventional art.
Figure 2:
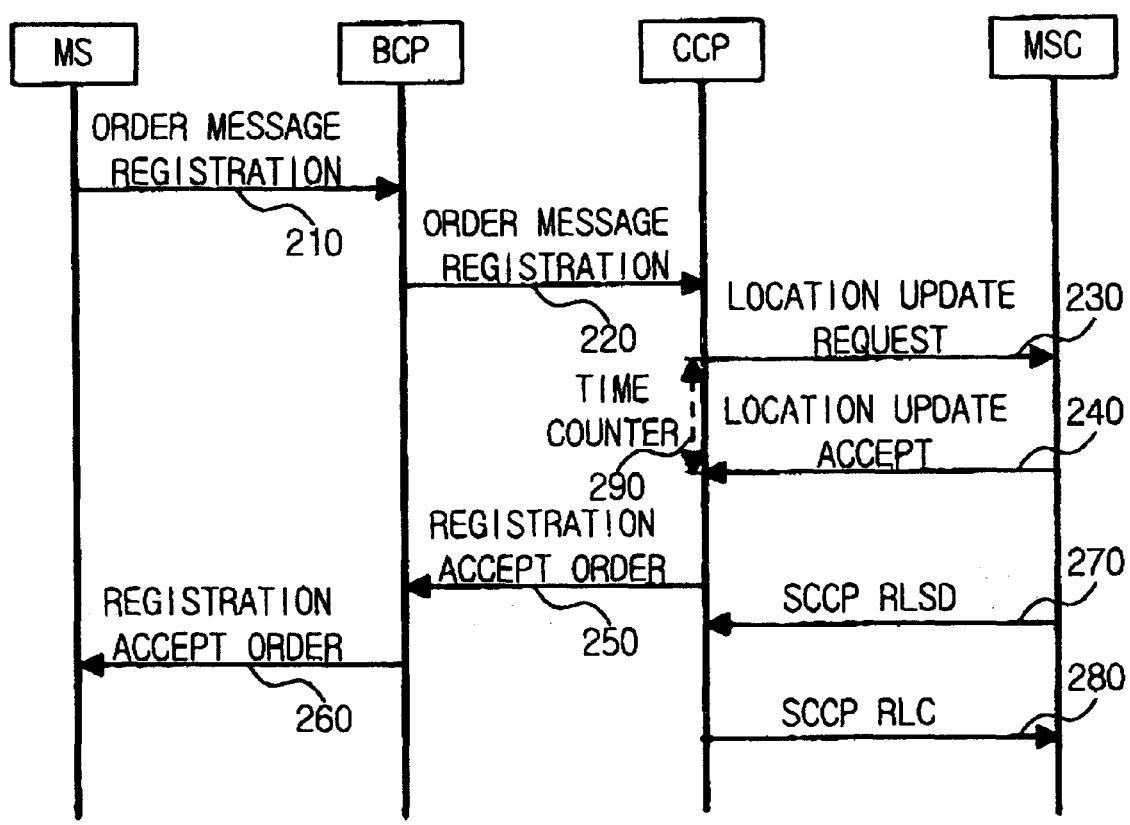
FIG. 2 is a block diagram illustrating the processing of location registration in a personal communication services (PCS), which uses an application interface standard according to the conventional art.
Figure 4:
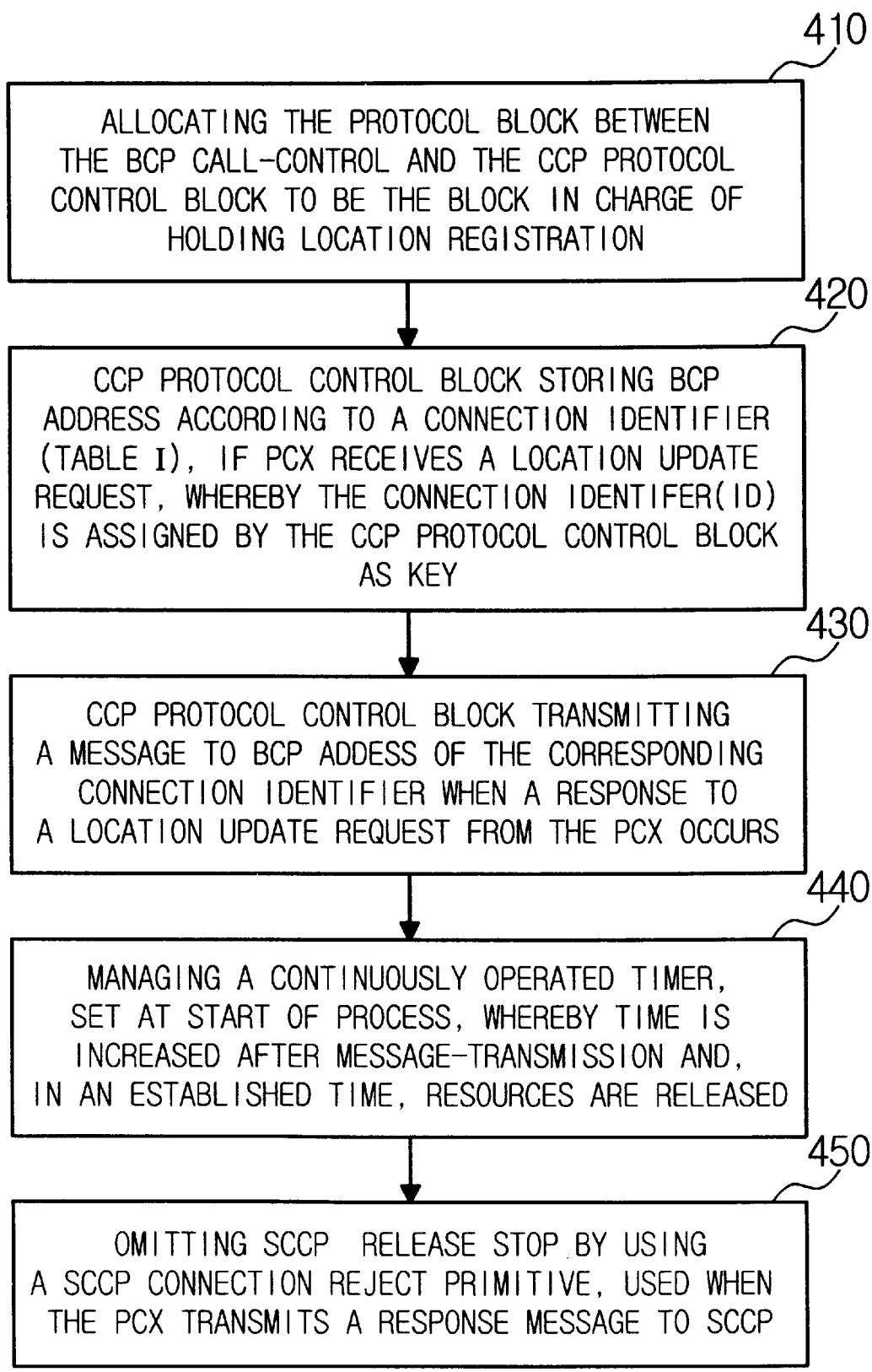
FIG. 4 is a flow chart of an internal processing method of a CCP according to the invention.

FIG. 4 illustrates an improved method according to the present invention, based on the method suggested by the application interface standard as illustrated in FIG. 2. The improved method is as follows:

(1) Change of Block in Charge of Processing (step 410)

The number of processing steps is reduced by changing the conventional step such that a message is transmitted through the BCP call control block, the CCP call control block and the CCP protocol control block to the MSC, into a step such that the message can be transmitted from the BCP call control block directly to the CCP protocol control block.

(2) Processing with Connection-oriented Method (step 420 and 430)

If the added parameter of location registration information type is deleted, the CCP does not know to which BCP that it should transmit the message, so it broadcasts the message, which is received from the MSC, to all base station transceiver subsystems. Therefore, the invention provides the steps for processing the message with a connection-oriented method.

The connection-oriented method allows an identifier per connection, respectively. By using the identifier, when the CCP first receives a location update request message from the BCP, the CCP stores each BCP address (if necessary, job identifier) in memory for the connection identifier, which is allocated by the CCP.

(3) Timer Management (step 440)

In case that after transmitting the location update request message, the timer is set every connection, there is a risk such that so many timer are set simultaneously.

So, a timer, which continuously operates, is set when the processing of location registration starts, and the time after the message-transmission is checked by using the timer. If the time reaches a specific time from when the message was transmitted, the timer releases time counter for the corresponding connection.

(4) Using SCCP Connection Refused Primitive (step 450)

From SCCP connection accept primitive and SCCP connection refused primitive, which can be used to transmit a response message by the MSC, by using SCCP connection refused primitive, a step of SCCP release is omitted.

Table 1 illustrates an embodiment of a CCP table, which is used in location registration according to the present invention.

As illustrated in Table 1, the CCP stores a BCP address corresponding to each connection identifier.

TABLE 1

| Connection identifier | BCP address | Time count |
|---|---|---|
| 0 | 0x18300000 | 5 |
| 1 | 0x18400000 | 6 |
| 2 | 0x18100000 | 2 |
| . | . | . |
| . | . | . |
| . | . | . |

As illustrated above, the connection identifier recognizes the BCP address. After transmitting and it has a value of time count such that it is a value from the message-transmission for location registration request per each BCP to message-reception.

Figure 3:
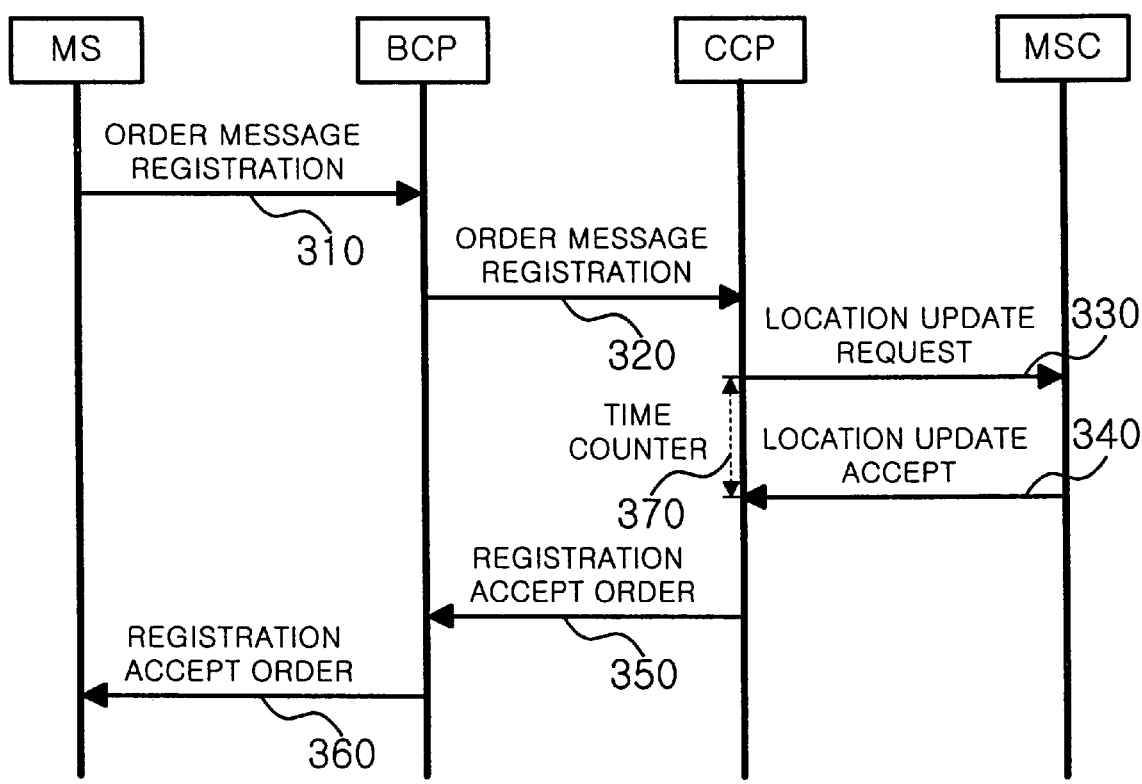
FIG. 3 is a block diagram illustrating the processing of location registration in personal communication services (PCS) according to the present invention.

FIG. 3 illustrates a method for processing of location registration according to the present invention. As illustrated, the method includes the steps of: transmitting a registration message to a base transceiver subsystem control processor (BCP) by a mobile station (MS) (step 310); transmitting a registration message to a call control processor (CCP) protocol-processing block as a processor of a base station controller (BSC) by the transceiver subsystem control processor (BCP) (step 320); transmitting a location update request message to mobile switching center (MSC) by the call control processor (CCP) (step 330); transmitting a location update accept message to the call control processor (CCP) by the mobile switching center (MSC) using a SCCP connection refused primitive (step 340); transmitting a registration accept order message to the base transceiver subsystem control processor (BCP) by the call control processor (CCP) (step 350); and transmitting a registration accept order message to a mobile station by the base transceiver subsystem control processor (BCP) (step 360).

The present invention, including the steps as stated above, is described in detail as follows:

If the processing of location registration starts, the CCP sets a timer, which continuously operates. In the steps of 310 and 320, the CCP protocol control block receives registration message through the BCP call control block from the mobile station. Then, the CCP allocates a new connection identifier to the address of the BCP, which has transmitted the message, and with the connection of the identifier, the CCP stores the information for the response to the processing of the location registration in a buffer.

Then, the CCP generates the location update request message and positions it on a complete network layer information message, then in the step of 330, transmits it to the MSC using the SCCP connection request primitive.

From now, the CCP increases a time counter connected with the connection identifier.

In the step of 340, the MSC performs the location registration and according to the result, transmits the location update accept message or the location registration refuse message to the CCP.

The location update accept message (or location registration refuse message) is transmitted by using the SCCP connection refused primitive.

In the step of 350, the CCP, which received the location update accept message in step 340, transmits registration accept order (if failed, registration refuse order) to the mobile station, through the BCP, having the address of corresponding identifier to inform that the location registration is successfully processed, and releases the resources related with the connection identifier such as time counter, BCP address, registration type, etc.

If a response is not received within a specific time-duration of the time counter from when the CCP transmitted the location update request message to MSC, the CCP releases the resources, which have been allocated to process the location registration.

That is, the CCP uses a timer whenever it transmits a connection request message according to the processing of the location registration. Instead, the CCP checks the value of time counter periodically for the current established connection. If the value reaches to a specific value, the CCP regards it as time-out and performs the steps of re-transmission or resource-release.

The present invention operated, as stated above, basically takes message types and steps that are determined as standard, so it can be easily inter-worked with other systems and it can reduce the system load by omitting the unnecessary steps for message-transmission.

Also, rather than use of a timer every connection as suggested in the standard, the present invention provides a timer, which continuously operates, to increase and check the value of the time counter. Therefore, the problem does not occur that the timers, up to the specific number of timers, are set simultaneously and the system is overloaded.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. For processing a location registration of a mobile station using a connection-oriented method of a standard of application interface between base station controller (BSC) and mobile switching center (MSC) in a personal communication services (PCS) system, an internal processing method of a call control processor (CCP) of a BSC comprises the steps of:

(a) allocating a block in charge of processing the location registration as a block for processing a protocol between a base transceiver subsystem control processor (BCP) call-control and a call control processor (CCP) protocol control block to reduce the number associated with inter-process communication (IPC);

(b) connection-oriented processing wherein if a personal communication exchange (PCX) receives a Location Update Request from a base transceiver subsystem control processor (BCP), the CCP protocol control block stores the BCP address or job address of the BCP according to a connection identifier, which is assigned by the CCP protocol control block, as a key, and then when a response to a location update request from the personal communication exchange (PCX) occurs, the CCP protocol control block transmits a message to a BCP address of the corresponding connection identifier;

(c) managing a timer wherein the timer is continuously operated and is set together with starting of process, and the time is increased after the message-transmission and, in an established time, the resources are releases; and (d) omitting a signaling connection control part (SCCP) release step by using a SCCP connection reject primitive, which is used when the PCX transmits a response message to the SCCP.

2. A method for processing of location registration in a personal communication services (PCS) system comprising the steps of:

(a) transmitting a registration message to a base transceiver subsystem control processor (BCP) by a mobile station;

(b) transmitting a registration message to a call control processor (CCP) protocol-processing block as a processor of a base station controller (BSC) by a base transceiver subsystem control processor (BCP) using connection-oriented processing wherein if a personal communication exchange (PCX) receives a location update request from the BCP, the CCP protocol-processing block stores a corresponding BCP address according to a connection identifier assigned by the CCP protocol-processing block for later use in transmitting a message to the BCP address;

(c) transmitting a location update request message to a mobile switching center (MSC) by the call control processor (CCP);

(d) transmitting a location update result message to the call control processor (CCP) by the mobile switching center (MSC);

(e) transmitting a location update result message to the base transceiver subsystem control processor (BCP) by the call control processor (CCP); and (f) transmitting a registration result order message to the mobile station by the base transceiver subsystem control processor (BCP).

3. The method of claim 2, wherein said location update result message is a location update accept message when the location update is accepted in the MSC, and said location update result message is a location update reject message when the location update is rejected in the MSC.

4. The method of claim 2, wherein said registration-result command message is a registration-accept command message when the location update is accepted in the MSC, and said registration-result command message is a registration-reject command message when the location update is rejected in the MSC.

5. The method of claim 2, wherein if said CCP receives registration message from the mobile station through the BCP, a connection identifier is newly assigned to an address of the BCP, which transmitted the message, and identifying information, preferably including a BCP address and types of registration, for the response to the processing of location registration, related with the identifier is stored.

6. The method of claim 2, wherein the CCP, which received the location update result message, transmits registration-result command message to the mobile station through the BCP having an address of a corresponding connection identifier, and releases resources related with the connection identifier.

7. The method of claim 6, wherein the resource related with said connection identifier comprises one of a time-counter, a BCP address, types of registration.

8. The method of claim 2, wherein the CCP protocol processing block stores a timer value of a timer, which continuously operates, before said steps for processing of location registration.

9. The method of claim 8, wherein said timer, when it counts the time after the transmission of location update request message from the CCP to the MSC and the count reaches a specific value, the CCP re-transmits the location update request message or releases the resources to be allocated for processing of location registration and terminates the steps for processing of location registration.

10. The method of claim 2, wherein the MSC transmits a location registration result message to the base station by using a signaling connection control part (SCCP) connection reject primitive.

* * * * *